Figure 1:
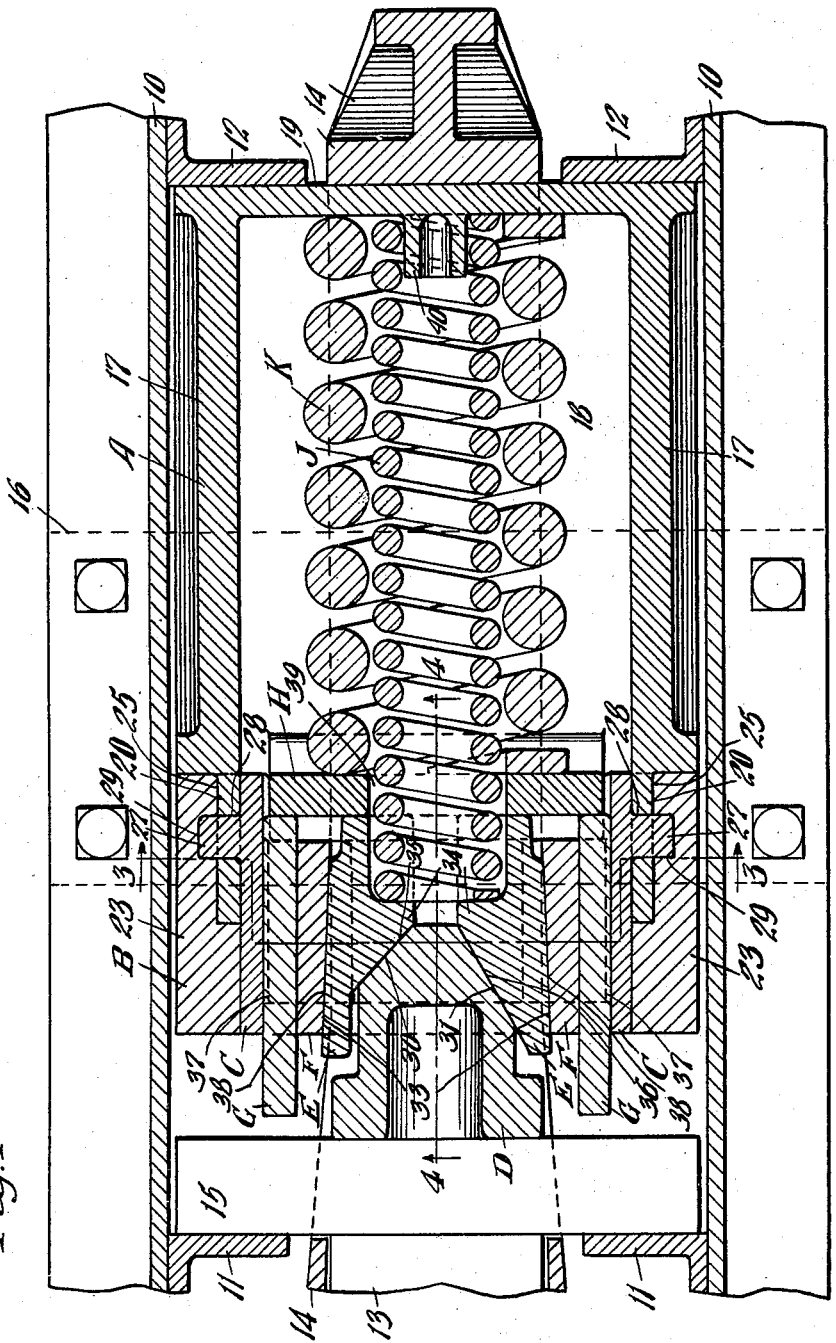

Feb. 18, 1930.  J. F. O'CONNOR  1,747,482
FRICTION SHOCK ABSORBING MECHANISM
Filed May 12, 1928   2 Sheets-Sheet 1

Witness
Wm. Geiger

Inventor
John F. O'Connor
By Joseph Harris
His Atty.

Feb. 18, 1930.        J. F. O'CONNOR        1,747,482
FRICTION SHOCK ABSORBING MECHANISM
Filed May 12, 1928    2 Sheets-Sheet 2
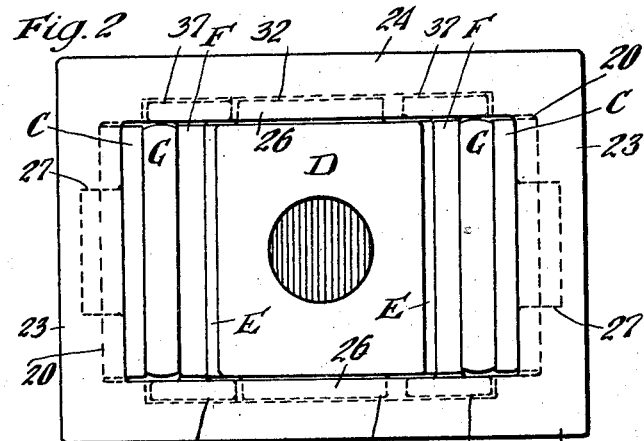
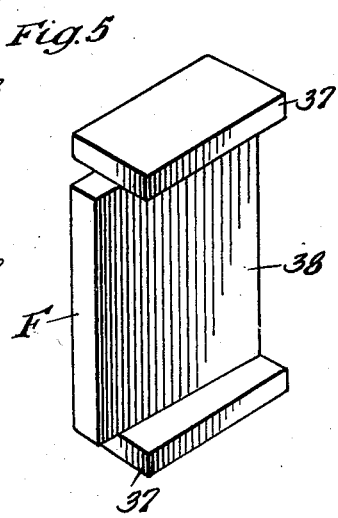
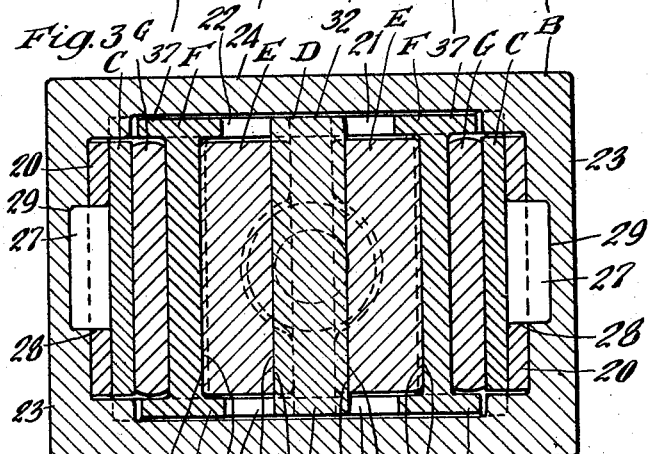
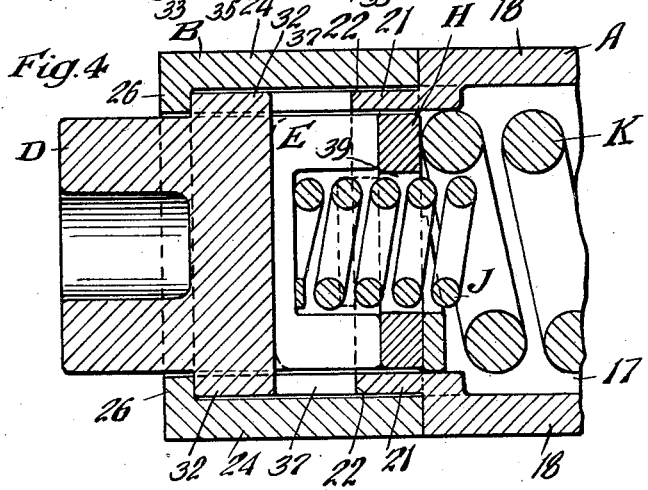
Inventor
John F. O'Connor
By Joseph Harris
His Atty.
Witness
Wm. Geiger Patented Feb. 18, 1930

1,747,482

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK-ABSORBING MECHANISM

Application filed May 12, 1928. Serial No. 277,266.

This invention relates to improvements in friction shock absorbing mechanisms.

One object of the invention is to provide a friction shock absorbing mechanism, including a casing, open at one end, providing a spring cage member having projecting wall sections at the open end, a strong metal shell telescoped with said section and locked to the same by anchoring liners defining opposite side walls of a friction shell section of the casing, friction means cooperating with the liners, and a spring resistance yieldingly opposing inward movement of the friction system with respect to the friction shell, the shell having means thereon for holding the friction system assembled with the other parts of the mechanism.

Another object of the invention is to provide a combined friction shell and spring cage for friction shock absorbing mechanisms, comprising a casing adapted to accommodate the spring resistance of a friction shock absorbing mechanism composed of friction elements and wedge means, and a shell detachably connected to the casing, and interior liners having means thereon for anchoring the shell to the casing, the liners being provided with interior friction surfaces with which the friction means of the shock absorbing mechanism cooperates, the liners being held in locking position by the spreading force exerted by the wedge means.

A still further object of the invention is to provide a friction shock absorbing mechanism, including a casing, open at one end, a shell partly telescoped with the open end section of the casing and detachably secured thereto, interior liners presenting opposed friction surfaces, friction means including movable friction elements, friction members held against movement longitudinally of the mechanism, friction shoes and wedge means, and a spring resistance, wherein the liners and the friction members have shouldered engagement with the outer edges of the walls of the casing and ribs on the shell, to hold the liners and friction members against longitudinal movement, and wherein the wedge is held against outward movement through shouldered engagement with the ribs of the shell.

Other and further objects of the invention will more clearly appear from the description and claims hereinafter following.

In the drawings, forming a part of this specification, Figure 1 is a horizontal, longitudinal, sectional view of a portion of the underframe structure of a railway car, illustrating my improvements in connection therewith. Figure 2 is a front end elevational view of the combined spring cage and friction shell of my improved mechanism. Figure 3 is a vertical, transverse, sectional view, corresponding substantially to the line 3—3 of Figure 1. Figure 4 is a longitudinal, vertical, sectional view, corresponding substantially to the line 4—4 of Figure 1. And Figure 5 is a detailed perspective view of a fixed friction member employed in connection with my improvements.

In said drawings, 10—10 indicate the usual channel-shaped center or draft sills of the railway car underframe, to the inner sides of which are secured front stop lugs 11—11 and rear stop lugs 12—12. The inner end portion of the coupler shank is designated by 13, to which is operatively connected a hooded yoke 14. My improved shock absorbing mechanism and a front main follower 15 are disposed within the yoke and the yoke is, in turn, supported by a detachable saddle plate 16, secured to the draft sills.

My improved shock absorbing mechanism comprises, broadly, a casing A and a detachable shell B, forming a combined friction shell and spring cage; two liners C—C; a main wedge D; two friction shoes E—E; two longitudinally disposed, relatively fixed friction members F—F; two longitudinally disposed, movable friction elements G—G; a spring follower H; and two spring resistance elements J and K.

The casing A is in the form of a substantially rectangular box-like member having relatively thick longitudinally disposed, spaced side walls 17—17, top and bottom longitudinally disposed, spaced walls 18—18, and a vertical, transverse end wall 19. The end wall 19 cooperates with the rear stop lugs 12 in the manner of the usual rear follower. The forward end portions of the side walls 17 of the casing A are reduced in thickness, as indicated at 20—20.

The reduced sections of the side walls are formed by cutting away the outer sides of the walls 17. The top and bottom walls 18 are also reduced in thickness at the outer ends, as indicated at 21—21, the walls 18 being exteriorly cut away, as shown, to provide these reduced sections. As will be clear upon reference to Figures 1 and 4, the wall sections 21 are shorter than the wall sections 20, the front edge portions of the wall sections 21 forming vertically disposed, transversely extending inner stop shoulders 22—22, as hereinafter more clearly described. As shown in Figure 4, the top and bottom walls 18 of the casing A are inwardly offset adjacent the wall sections 21 to reinforce the latter.

The shell B is also in the form of a substantially rectangular box-like casing, open at the opposite ends. The shell B is formed by vertically disposed, spaced, side walls 23—23 and horizontally disposed, spaced, top and bottom walls 24—24. The walls of the shell B are relatively heavy, as shown, and the shell is preferably formed of strong metal, and may be constructed of alloy steel, which is heat treated. The side walls 23 of the shell B are interiorly cut away at the inner ends, as indicated at 25—25, to telescopically receive the reduced side wall sections 20—20 at the forward end of the casing A. The top and bottom walls 24 of the shell B are also interiorly cut away, as most clearly illustrated in Figure 4, thereby providing transversely disposed, inwardly projecting ribs or flanges 26—26 at the outer end of the shell, these ribs acting as outer limiting stops, as hereinafter more clearly pointed out.

Upon reference to Figures 1 and 4, it will be seen that the shell B tightly fits the outer faces of the walls of the reduced section of the shell B and has the inner end thereof abutting the transverse faces formed by cutting away the front end of the casing A. As shown in Figure 1, the inner surfaces of the front end portions of the side walls 23 of the shell B are flush with the inner surfaces of the reduced wall sections 20 of the casing A, thereby presenting a continuous bearing surface for the outer side of the corresponding liner C.

The liners C are two in number and are disposed at opposite sides of the casing A and shell B. Each liner is in the form of a heavy rectangular plate, having a longitudinally disposed friction surface at the inner side thereof. Each plate C is of a length corresponding to the length of the shell B and is provided with a laterally projecting securing lug 27 on the outer side thereof, spaced slightly from the inner end of the plate. The securing lug 27 is of such a length as to extend entirely through the reduced wall section 20 of the casing A and into the corresponding side wall 23 of the shell B. The walls 20 are provided with openings 28 extending entirely therethrough, adapted to accommodate the lugs 27, and the walls 23 of the shell B are provided with recesses 29 on the inner sides thereof, adapted to receive the extremities of the lugs 27. The lugs 27 and the openings 28 and the recesses 29 are so proportioned as to provide a snug fit, so that the liners will be anchored against longitudinal movement with respect to the combined friction shell and spring cage, and the shell B will be locked to the casing A against longitudinal displacement.

The wedge member D is in the form of a block having a flat front end face which bears directly on the inner side of the front main follower 15. At the inner end, the wedge block D is provided with a pair of inwardly converging wedge faces 30 and 31. As shown, the wedge face 30 is disposed at a blunter angle with respect to the longitudinal axis of the mechanism than the wedge face 31. As shown in Figure 4, the inner end portion of the wedge block D is provided with top and bottom enlargements 32—32 which fit between the top and bottom walls of the shell B and present transversely disposed front abutment shoulders which are adapted to engage in back of the ribs 26 of the shell B, to thereby limit outward movement of the wedge block and hold the same assembled with the combined friction shell and spring cage.

The two friction shoes E are disposed at opposite sides of the wedge and are of similar design, except as hereinafter pointed out. Each shoe E is provided with a longitudinally disposed, flat friction surface 33 on the outer side thereof, which cooperates with the corresponding friction member F. On the inner side, each shoe is provided with a lateral enlargement 34, having a wedge face on the front side thereof. The wedge face of the shoe E which cooperates with the wedge face 30 of the wedge block D is designated by 35, and the wedge face of the block E which cooperates with the wedge face 31 of the wedge block D is designated by 36.

As clearly shown in Figure 1, the wedge face 35 is correspondingly inclined to the wedge face 30, and the wedge face 36, which is disposed at a relatively keen wedging angle, is correspondingly inclined to the wedge face 31. By the arrangement of blunt and keen wedge faces provided, proper wedging action is assured through the keen wedge faces during compression of the mechanism, and release is facilitated by the cooperating blunt wedge faces.

The friction members F are disposed at opposite sides of the wedge blocks E and are in the form of relatively heavy rectangular plates having top and bottom flanges 37—37 projecting on the opposite sides thereof. The inner sides of the flanges overhang the friction shoes E and guide the same in their longitudinal movement and prevent contact of the friction shoes with the top and bottom walls 21 of the casing. The outer sides of the flanges 37 overhang the movable friction elements G and guide these elements in their longitudinal movement, holding the same out of engagement with the top and bottom walls of the casing A. As shown in Figure 5, the flange sections 37 are shorter than the plate sections of the friction members F, being offset inwardly from the front ends of the plates. The flange sections 37 engage between the transverse ribs or flanges 26 of the shell B and the stop shoulders 22 formed by the front edges of the top and bottom walls 21 of the casing A. The members F are thus anchored against longitudinal movement with respect to the combined friction shell and spring cage, while lateral displacement of the same is permitted. The plate sections of the members F present friction surfaces on the opposite sides thereof, the friction surfaces on the inner sides of the plates being indicated by 38.

As shown in Figure 1, the friction surfaces 38 of the plates are inclined with respect to the longitudinal axis of the mechanism and converge inwardly. In this connection, it is pointed out that the cooperating friction surfaces 33 of the friction shoes are correspondingly inclined.

The friction elements G, which are two in number, are interposed between the friction members F and the liners C. Each friction element G is in the form of a substantially rectangular plate of greater length than the corresponding friction member F. As shown in the normal position of the parts, the front ends of the friction elements G are spaced from the inner side of the main follower 15 and the inner ends bear directly on the spring follower H, while the inner ends of the friction members F are spaced an appreciable distance from said spring follower.

The spring follower H is in the form of a heavy rectanguular plate, having a central opening 39 which is of greater size than the diameter of the coil of the inner spring resistance J and is adapted to loosely receive the front end portion of said coil.

The main spring resistance K, which is heavier than the spring resistance J, surrounds the latter and is interposed between the spring follower H and the rear end wall 19 of the casing A. The spring resistance J is interposed directly between the enlargements of the friction shoes E and the inner end wall 19 of the casing A, the same being held in centered position by an inwardly projecting lug 40 on the end wall 19 which engages within said coil. The front end portion of the coil extends freely through the opening 39 of the spring follower H, as hereinbefore pointed out.

The parts of the mechanism are so proportioned that when assembled the main spring resistance elements J and K are under an initial compression, thereby maintaining the wedge and friction elements in their outermost position and compensating for wear of the same.

In assembling my improved shock absorbing mechanism, the spring resistance elements J and K and the spring follower H are placed within the casing A and the liners C are placed in position with the lugs 27 thereof, inserted in the openings 28 of the side wall sections 20 of the casing A. The wedge block, friction shoes and friction members F are then assembled with the shell B, and the shell B, with the parts thus assembled, telescoped exteriorly with the walls 20 and 21 of the casing A. When thus assembled, the liners C are forced outwardly to engage the extremities of the lugs 27 within the recesses 29 of the side walls 23 of the shell, and the movable friction elements G are inserted in position between the fixed friction members F and the liners C. When thus assembled, it will be evident that the expansive action of the spring J, which forces the shoes into engagement with the wedge faces of the wedge block D, will cause spreading apart of the shoes, placing the friction members F and the friction elements G under lateral pressure, forcing the same laterally outwardly against the liners C and holding the latter seated on the inner sides of the walls of the shell B and the casing A, thereby maintaining the locking lugs 27 engaged with the recesses 29 of the shell B and securing the shell in fixed relation with the casing A.

The operation of my improved shock absorbing mechanism, in either a buffing or draft action, is as follows: The front follower 15 and the casing A will be moved relatively toward each other, thereby forcing the wedge block D inwardly, carrying the friction shoes E therewith, while subjecting the same to lateral spreading action. During the inward movement of the friction shoes E, the same will slip on the friction surfaces of the longitudinally fixed friction members F. During this action, the springs J and K will be compressed and the spring follower H moved inwardly away from the inner ends of the movable friction elements G. During the first part of the compression stroke, the friction elements G will not be actuated because they are spaced from the front follower 15. When the clearance between the follower and the front ends of the friction elements G has been taken up, the latter will be forced inwardly, sliding on the friction surfaces of the friction members F and the liners C. Inasmuch as the follower H is spaced from the inner ends of the friction plates G, after the mechanism has been compressed, the springs J and K will both act to release the friction wedge means by forcing the friction shoes and wedge block D outwardly during the first part of the releasing action. Release is thus greatly facilitated, because the friction wedge system is forced outwardly during the initial releasing action independently of the plates G. In case the plates G should not release immediately when engaged by the spring follower, further outward movement of the friction shoes and the wedge block D is effected by the expansion of the inner coil J of the spring resistance.

As will be evident, due to the inner friction surfaces of the friction members F converging inwardly, the releasing action between the friction shoes and these members is greatly facilitated.

When the mechanism has been fully compressed, inward movement of the main follower 15 with respect to the casing A is limited by engagement of the main follower with the outer end of the shell B, the shell B and casing A thus acting as a solid column load-transmitting member to transmit the actuating force directly to the stop lugs of the draft sills.

During release, the initial expansion of the springs J and K will force the friction shoes and wedge block D outwardly until the spring follower H engages the inner ends of the friction elements G, whereupon the latter will be carried outwardly also. Outward movement of the wedge block D is finally limited by engagement of the enlargements 32 with the ribs 26 of the shell B. When fully released, the parts will assume the position illustrated in Figure 1.

While I have herein shown and described what I consider the preferred manner of carrying out my invention, the same is merely illustrative and I contemplate all changes and modifications which come within the scope of the claims appended hereto.

I claim:

1. In a combined friction shell and spring cage for friction shock absorbing mechanisms, including friction means and a main spring resistance, the combination with a casing open at one end, adapted to house the main spring resistance; of a shell partly telescoped exteriorly with said open end section of the casing; liners presenting opposed friction surfaces disposed within the open end section of the casing and provided with anchoring members extending through the walls of said open end section and interlocked with the shell to fix the same to the casing.

2. In a friction shock absorbing mechanism, the combination with a casing open at one end, providing a spring cage member; of a heavy shell telescoped with said open end section of the casing; opposed liners disposed within the open end section of the casing, said liners having anchoring lugs anchored to the walls of the casing and extending therethrough in interlocking relation with the shell, said liners together with the top and bottom walls of the shell defining the friction shell proper of the mechanism; movable friction means cooperating with the liners; and spreading means for placing said movable means under lateral pressure and forcing the same against the liners to hold said liners in anchored position.

3. In a friction shock absorbing mechanism, the combination with a casing open at one end, said casing at said open end having the walls thereof reduced in thickness; of a heavy shell telescoped exteriorly with said reduced wall sections, said shell being of greater length than said reduced wall sections; opposed liners bearing on the inner sides of the walls of said shell and the walls of the open end section of the casing; means on said liners extending through the reduced wall sections of said casing and into the walls of said shell, to fix the shell to the casing; friction means cooperating with the shell; spreading means for placing the friction means under lateral pressure for holding the liners separated and in locking position; and spring resistance means within the casing.

4. In a friction shock absorbing mechanism, the combination with a casing having top, bottom and side walls, said casing being open at one end; of a shell telescoped with said casing, said shell having interior front limiting shoulders; friction means within the shell, including movable and relatively fixed elements, certain of said elements having their outward movement limited by said limiting shoulders and the fixed elements having shouldered engagement with said limiting shoulders and with the outer edges of the top and bottom walls of the casing, to hold said elements against movement longitudinally of the mechanism; and spring resistance means within the casing.

5. In a friction shock absorbing mechanism, the combination with a casing having top, bottom and side walls, said casing being open at one end, the top, bottom and side walls being reduced in thickness at said open end; of a shell having top, bottom and side walls, said shell being open at both ends, the walls at the inner end of the shell being interiorly cut away, the cut-away section of said shell being telescoped with the reduced wall section of the casing, the inner surfaces of the side walls of the shell and the inner surfaces of the side wall of the casing being flush when the shell and casing are assembled; plate-like liners engaged with the interior side wall portions of said shell and open end section of the casing, said liners having laterally outwardly projecting anchoring lugs extending through the telescoped side wall sections of the casing and shell to lock the shell to the casing; friction means cooperating with said liners; a spreading element cooperating with said friction means; and a spring resistance within the casing.

In witness that I claim the foregoing I have hereunto subscribed my name this 10th day of May, 1928.

JOHN F. O'CONNOR.